United States Patent [19]

Muhler et al.

[11] 4,134,999

[45] Jan. 16, 1979

[54] NONCARIOGENIC COMESTIBLE

[75] Inventors: Joseph C. Muhler, Howe; Carl J. Kleber, Fort Wayne, both of Ind.; Ray G. Kelly, Kirkwood, Mo.

[73] Assignee: Indiana University Foundation, Bloomington, Ind.

[21] Appl. No.: 855,740

[22] Filed: Nov. 29, 1977

Related U.S. Application Data

[63] Continuation-in-part of Ser. No. 787,752, Apr. 15, 1977, abandoned, which is a continuation of Ser. No. 654,058, Jan. 30, 1976, abandoned.

[51] Int. Cl.$^2$ .............................................. A23L 1/236
[52] U.S. Cl. ...................................... 426/3; 426/590; 426/548; 426/660; 426/653; 426/804; 424/49
[58] Field of Search ............... 426/548, 804, 660, 572, 426/573, 590, 3; 424/343, 361, 180, 48, 49

[56] References Cited

U.S. PATENT DOCUMENTS

| 3,278,314 | 10/1966 | Colby | 426/548 |
|---|---|---|---|
| 3,556,811 | 1/1971 | Smith | 426/548 |
| 3,619,294 | 11/1971 | Black | 426/548 |
| 3,639,169 | 2/1972 | Broeg | 426/548 |
| 3,738,843 | 6/1973 | Frey | 426/548 |
| 3,914,434 | 10/1975 | Bohni | 426/548 |

OTHER PUBLICATIONS

Shaw et al., "Partial Substitution of Hexitols for Sugars and Dextrin in Caries-Producing Diets," J. Dent Res. 39; 377-384, 1960.
McDonald et al., "Influence of Different Carboxylic Acids on Enamel Dissolution in the Presence and Absence of Sucrose," J. Dent. Res. 54:187, 1975.
Scheinin et al., "Turku Sugar Studies, " Acta Odont. Scand. 32:383-412, 1974.
Bowen, "Dental Caries," Contemporary Nutrition, vol. 2, No. 8 (Aug. 1977).

*Primary Examiner*—Jeanette M. Hunter
*Attorney, Agent, or Firm*—Kirkland & Ellis

[57] ABSTRACT

Noncariogenic comestibles (i.e., food products that do not cause dental caries) may be obtained by employing as a nutritive sweetening system therein a homogenous mixture of at least one first sweetening agent consisting of sorbitol and/or xylitol and at least one second sweetening agent consisting of dextrose and/or fructose, with the mixture containing at least about 75% of the first agent by weight of the mixture where dextrose is the second agent and at least about 60% of the first agent where fructose is the second agent. Advantageously and optionally, such a sweetening system is provided in candies in association with adipic and/or ascorbic acid as a flavoring agent.

18 Claims, 4 Drawing Figures

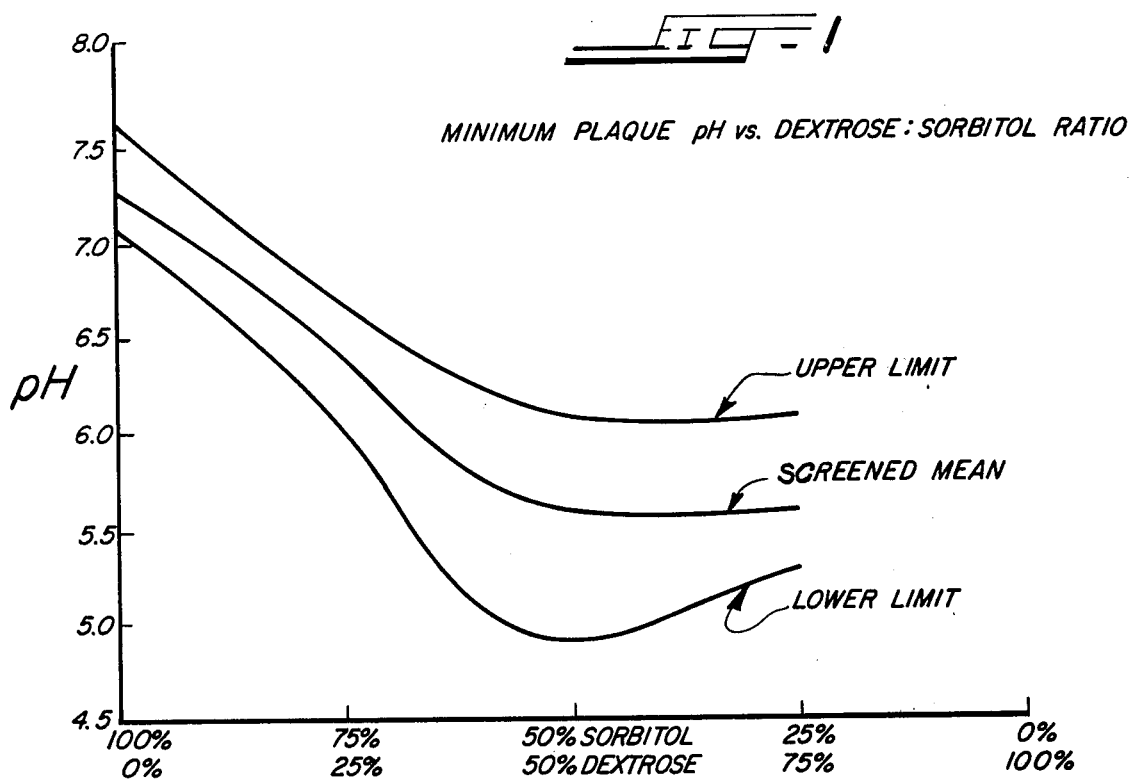
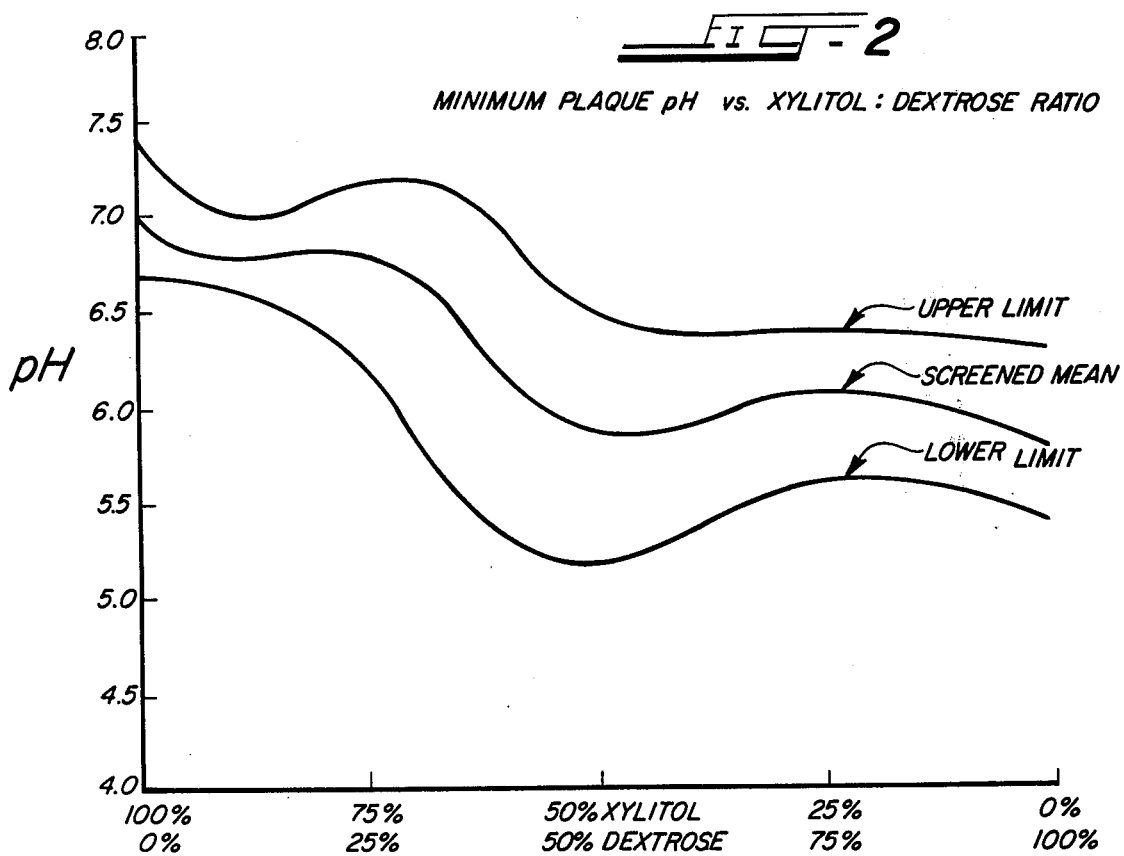

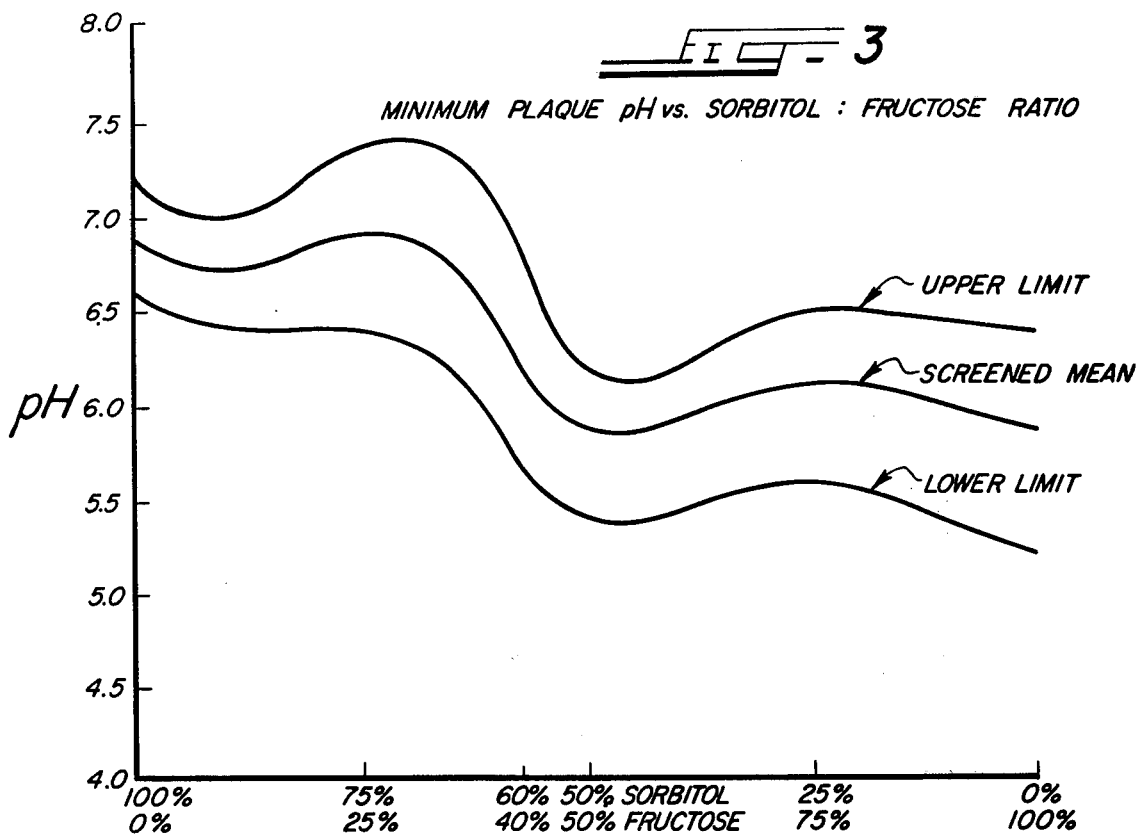
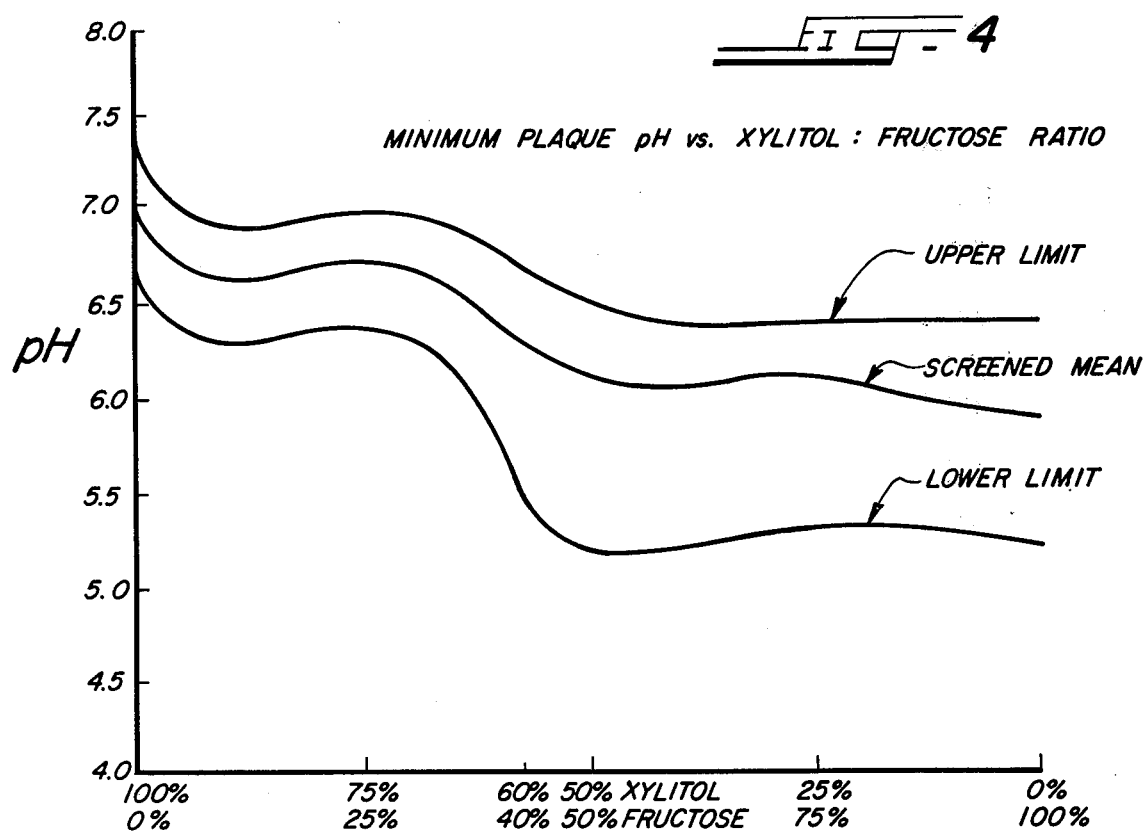

NONCARIOGENIC COMESTIBLE

CROSS-REFERENCE

This application is a continuation-in-part of applicants' co-pending Ser. No. 787,752 application, filed Apr. 15, 1977 now abandoned, which was a continuation of applicants' Ser. No. 654,058 application filed Jan. 30, 1976 now abandoned.

BACKGROUND OF THE INVENTION

1. Field of the Invention

This invention relates to the production of comestibles. More specifically it is concerned with a candy product which is rendered noncariogenic through the use of a novel specific nutritive sweetening system and optionally through use of a unique carboxylic acid system that does not decalcify the enamel.

2. Description of the Prior Art

The prior art has long sought a means to compensate for the cariogenic potential of comestibles, particularly foods containing high preponderances of nutritive sweeteners such as sucrose and other sugars and acids which erode tooth enamel and dentin. It has been theorized that when sugars are placed in the mouth, they combine with acid-producing bacteria to form lactic, fumaric, and other acids which promote dental caries.

A contributing cause of dental caries in children is the adherence of highly refined sugars and their decomposition products to the dental plaque after ingestion, coupled with the slow rate of oral clearance, or the ability to produce high amounts of acid, or combinations of such factors.

A number of anticariogenic agents have been evaluated in the past in systems wherein the agent is applied or consumed topically (i.e., directly on the teeth) in the form of a dentifrice (e.g., a toothpaste or a toothpowder). However, knowledge gained on the anticariogenic effectiveness of agents used in such topical applications has not permitted prediction of efficacy for these anticariogenic agents in other applications, such as in foods, and particularly in foods containing a substantial portion of sugars.

Unfortunately, known anticariogenic agents have in general not provided any substantial degree of protection when used in foodstuffs. Thus, known anticariogenic agents such as fluorides, phosphates, vitamin K, nitrofurans, ammonium compounds, iodoacetic acid and the like, when added separately to a foodstuff containing a high percentage of sugar, have little direct topical effect in a foodstuff environment.

Accordingly, the primary object of this invention is to provide means for overcoming the disadvantages of the prior art approaches to reducing the dental caries potential of sugar containing foodstuffs.

A related object is to provide a new nutritive sweetening system for use in candies in place of the sweetening systems heretofore employed.

A still further object is to provide new noncariogenic candies.

SUMMARY OF THE INVENTION

The foregoing and other objects, advantages, and features of this invention may be achieved by employing as a nutritive sweetener in comestibles such as candies a homogeneous mixture of at least one first sweetening agent selected from the group consisting of sorbitol, xylitol and mixtures thereof and at least one second sweetening agent selected from the group consisting of dextrose, fructose and mixtures thereof. The mixture contains at least about 75% of the first sweetening agent by weight of the mixture where dextrose is the second agent and at least about 60% of the first agent where fructose is the second agent. The mixture is provided in an amount effective to sweeten the comestible. Advantageously and optionally, such a noncariogenic nutritive sweetener may be combined in a candy with up to about 6% by weight of the product of a member selected from the group consisting of adipic acid, ascorbic acid, and mixtures thereof as a flavoring agent.

By employing the sweetening and flavoring systems in candy products, there are obtained products which, when introduced into the mouth, exhibit: little or no harmful lowering of the dental plaque pH (indicating that the formation of decay causing oral acids has been minimized); no significant harmful decalcificaton of the dental enamel (decalcification being a precursor of dental caries formation); and rapid oral clearance.

DESCRIPTION OF THE DRAWING

FIGS. 1–4 are plots of minimum plaque pH versus composition obtained with various nutritive sweetening systems in accordance with this invention.

DETAILED DESCRIPTION OF THE PREFERRED EMBODIMENTS

In accordance with this invention, comestibles such as candies and the like, which have heretofore used dental caries promoting nutritive sweeteners such as simple sugars, may be rendered noncariogenic by employing as a nutritive sweetening system a homogeneous mixture of at least one first sweetening agent selected from the group consisting of sorbitol, xylitol and mixtures thereof and at least one second sweetening agent selected from the group consisting of dextrose, fructose and mixtures thereof, with the mixture containing at least about 75% first agent by weight of the mixture where dextrose is the second agent and at least about 60% of the first agent where fructose is the second agent. The mixture is provided in comestibles in an amount effective to sweeten them.

As used herein, the term "comestible" should be understood to mean substantially any of the wide range of food products suitable for ingestion by humans including without limitation candies, bakery products, chewing gum, prepared beverages and beverage mixes, fruit preparations, etc.

Such a nutritive sweetening system is advantageously and optionally provided in cooked or uncooked hard candies in which up to about 6% by weight of a member selected from the group consisting of adipic acid and ascorbic acid and mixtures thereof is provided as a flavoring adjuvant. The nutritive sweetening system of this invention may be used in other types of candies such as taffies and caramels, chocolates and chocolate coatings and in other candy products in which high preponderances of nutritive sweeteners are employed. Where candy products are produced from a variety of individual constituents (as in candies in which a cooked sugar based center may be coated with chocolate), the nutritive sweetening system of this invention may be employed in one or more of the constituents (e.g., as a replacement for the sugar in the cooked center or in the chocolate coating), or in all of them.

As noted, a primary feature of this invention is the use as noncariogenic sweeteners of homogeneous mixtures of at least one first sweetening agent in combination with at least one second sweetening agent, such mixtures containing at least about 75% by weight of the first agent when the second agent is dextrose and at least about 60% by weight of the first agent where the second agent is fructose.

Sorbitol is the preferred first agent, with dextrose being the preferred second agent on the basis of cost and availability. Desirably, homogeneous mixtures of the first and second agents are employed.

Where sorbitol-dextrose or xylitol-dextrose mixtures are employed, a 75% sorbitol and/or xylitol - 25% dextrose mixture is preferred. Where fructose is employed, somewhat greater amounts of the second sweetening agent may be employed. Thus, about 40% fructose is preferred in the case of sorbitol-fructose and xylitol-fructose mixtures.

In order for the oral health benefits of this invention to be achieved the mixture of first and second agents should be substantially homogeneous; that is, the mixture should be uniform.

Generally, the sweetening mixtures of this invention are employed at the same levels that the sugar or other cariogenic sweetening systems have been employed. Thus, the noncariogenic nutritive sweetening systems of this invention are employed in a candy product, preferably at a level of about 40–100% by weight of the candy product.

Where it is desired that a carboxylic acid be employed in the candy product for its tart taste and in order to enhance fruit flavors, it is preferred that adipic acid, ascorbic acid or mixtures thereof be used in order that the desired objective of a noncariogenic candy product may be maintained. An important feature of this invention is the discovery that, in comparison with other conventionally used carboxylic acids such as citric acid and malic acid, ascorbic and adipic acids are relatively safe and do not decalcify the teeth when present in the mouth during the rapid oral clearance period achieved with the candies of this invention. Such an acid constituent of a candy is provided at a level of about 0–6% by weight of the candy, preferably about 2–4% by weight of the candy.

Candy products produced in accordance with this invention are essentially the same as prior art candy products with the exception that, by virtue of the substitution of the noncariogenic nutritive sweetening system of this invention, the candy products hereof may be safely consumed without causing or promoting dental caries.

Thus, noncariogenic candy products produced in accordance with this invention may contain usual and customary complementary ingredients conventionally found in candy products such as colorings, flavorings, dairy and vegetable fats, foaming agents, texturing agents such as crisped rice, nuts, and the like. However, in addition to the sucrose usually employed, certain conventional candy ingredients are undesirable from a dental standpoint. For example, significant amounts of fats and texturing agents such as crisped rice may adversely affect the oral clearance of the candy. Nonetheless, by employing the sweetening agents of this invention in place of the cariogenic sweeteners heretofore employed, the candies may be rendered less harmful to the teeth.

Candies produced in accordance with this invention may be prepared using the noncariogenic nutritive sweetening system of this invention in place of the simple sugar or other cariogenic sweetening system heretofore employed. Manufacturing techniques are generally the same although certain modifications must be made by reason of the use of sorbitol and/or xylitol as the principal constituent of the sweetening system.

Thus, in the case of tableted candies, the same techniques of mixing the ingredients and forming them into tablets are used, but, in the case of sorbitol, somewhat greater humidity control must be exerted because it is a desiccant. An agent such as magnesium stearate may also be added at low levels in order to facilitate removal of the tablets from the mold.

With knowledge of these properties of the sorbitol containing sweetening agents of this invention, one skilled in the art can readily adapt existing candy processing techniques to the preparation of other candy products pursuant to this invention.

The compositions of exemplary noncariogenic candies produced in accordance with this invention are given in the following examples.

EXAMPLE I

| Constituent | Tableted Candy Parts by Weight |
|---|---|
| Sorbitol | 72.4 |
| Dextrose | 24.1 |
| Flavorings, Colors, etc. | 0.5 |
| Adipic Acid | 3.0 |

EXAMPLE II

| Constituent | Tableted Candy Parts by Weight |
|---|---|
| Sorbitol | 82.0 |
| Dextrose | 14.5 |
| Ascorbic Acid | 3.0 |
| Flavoring, Colors, etc. | 0.5 |

EXAMPLE III

| Constituent | Tableted Candy Parts by Weight |
|---|---|
| Xylitol | 72.0 |
| Dextrose | 24.0 |
| Adipic Acid | 3.0 |
| Flavoring, Colors, etc. | 0.7 |
| Magnesium Stearate | 1.0 |

EXAMPLE IV

| Constituent | Tableted Candy Parts by Weight |
|---|---|
| Sorbitol | 57.0 |
| Fructose | 38.0 |
| Adipic Acid | 3.0 |
| Flavoring, Colors, etc. | 0.7 |
| Magnesium Stearate | 1.0 |

EXAMPLE V

| Constituent | Tableted Candy Parts by Weight |
|---|---|
| Sorbitol | 71.4 |
| Fructose | 23.4 |
| Adipic Acid | 3.0 |

-continued

| Tableted Candy | |
|---|---|
| Constituent | Parts by Weight |
| Flavoring, Colors, etc. | 0.7 |
| Magnesium Stearate | 1.0 |

EXAMPLE VI

| Tableted Candy | |
|---|---|
| Constituent | Parts by Weight |
| Sorbitol | 64.1 |
| Dextrose | 15.5 |
| Fructose | 15.5 |
| Adipic Acid | 1.5 |
| Ascorbic Acid | 1.5 |
| Flavorings, Colors, etc. | 1.0 |
| Magnesium Stearate | 1.0 |

EXAMPLE VII

| Tableted Candy | |
|---|---|
| Constituent | Parts by Weight |
| Sorbitol | 35.7 |
| Xylitol | 35.7 |
| Dextrose | 23.8 |
| Adipic Acid | 3.0 |
| Flavoring, Colors, etc. | 0.7 |
| Magnesium Stearate | 1.0 |

EXAMPLE VIII

| Tableted Candy | |
|---|---|
| Constituent | Parts by Weight |
| Xylitol | 71.4 |
| Dextrose | 23.8 |
| Adipic Acid | 3.0 |
| Flavoring, Colors, etc. | 0.7 |
| Magnesium Stearate | 1.0 |

EXAMPLE IX

| Tableted Candy | |
|---|---|
| Constituent | Parts by Weight |
| Xylitol | 57.0 |
| Fructose | 38.0 |
| Adipic Acid | 3.0 |
| Flavorings, Colors, etc. | 0.7 |
| Magnesium Stearate | 1.0 |

EXAMPLE X

| Cooked Hard Candy | |
|---|---|
| Constituent | Parts by Weight |
| Sorbitol (70% solution) | 81.8 |
| Dextrose | 17.3 |
| Adipic Acid | 0.8 |
| Flavoring, Colors, etc. | 0.2 |

EXAMPLE XI

| Cooked Hard Candy | |
|---|---|
| Constituent | Parts by Weight |
| Sorbitol (70% solution) | 89.0 |
| Fructose | 9.9 |
| Ascorbic Acid | 0.8 |

-continued

| Cooked Hard Candy | |
|---|---|
| Constituent | Parts by Weight |
| Flavoring, Colors, etc. | 0.2 |

EXAMPLE XII

| Taffy | |
|---|---|
| Constituent | Parts by Weight |
| Sorbitol (70% solution) | 70.1 |
| Dextrose | 16.3 |
| Egg Albumin (45.27% solution) | 2.4 |
| 92 degree coconut oil | 8.9 |
| Adipic Acid | 1.7 |
| Sodium Alginate | 0.3 |
| Calcium Acetate | 0.1 |
| Emulsifier | 0.1 |
| Flavoring, Colors, etc. | 0.2 |

EXAMPLE XIII

| Chocolate Candy Coating | |
|---|---|
| Constituent | Parts by Weight |
| Sorbitol | 42.0 |
| Dextrose | 14.0 |
| Kaomel (hard butter) | 30.9 |
| Cocoa Powder | 7.8 |
| Non Fat Dry Milk | 4.2 |
| Lecithin | 0.3 |
| Salt | 0.1 |
| Vanilla Powder | 0.9 |

EXAMPLE XIV

| Peanut Brittle | |
|---|---|
| Constituent | Parts by Weight |
| Sorbitol (70% solution) | 50.1 |
| Dextrose | 16.7 |
| Mannitol | 0.5 |
| Spanish Peanuts | 30.0 |
| Butter | 2.0 |
| Antioxidant Salt | 0.7 |

EXPERIMENTAL EVALUATIONS

The noncariogenic attributes of the products produced in accordance with this invention have been verified by the following experimental studies.

The prime criteria employed in evaluating the noncariogenicity of the candy products of this invention are: (1) the effect of such candy on the pH of the dental plaque; (2) the degree to which such candies cause decalcification of the dental enamel; and (3) the time taken for the product to clear the oral cavity following ingestion.

The pH of dental plaque is determined intra-orally by use of a standard pH meter in conjunction with speciallly developed antimony micro-electrodes and a salt bridge similar to the assembly described in Kleinberg, "The Construction and Evaluation of Modfied Types of Antimony Micro-Electrodes for Intra-Oral Use," *British Dental Journal,* Vol. 104, pages 197-204 (1958). The micro-electrodes are placed on the mesial surface of the maxillary left first molar, all subsequent measurements being made from this same area. Each test subject is not allowed to brush his teeth for 2 days (in order to develop sufficient plaque for testing) or to eat anything 1 hour before testing. Initially a Stephan curve (i.e., a plot of plaque pH versus time) is obtained for each subject following challenge for 1 minute with a 25% glucose solution. The plaque pH is measured initially before challenge and 10 times afterwards over 2-minute intervals until the resting plaque pH is restored. The subject is then allowed to brush his teeth and develop a new growth of 2-day-old plaque. Subsequent testing is then conducted by having each subject eat the appropriate candy product and again determining the plaque pH versus time.

The plaque pH lowerings produced by the candy or candy ingredients are then compared to the standard glucose plaque pH drop of each subject and are expressed on a percentage basis, the glucose pH decrease being taken as 100%. Thus, the smaller the percentage decrease or the greater percentage increase, the less cariogenic the candy product. Alternatively, the actual minimum plaque pH may be used as the experimental result.

The phenomenon of dental enamel decalcification is measured in the following manner. Sound central incisors are mounted in self-curing acrylic resin, with only the labial surface exposed and are given a thorough prophylaxis with a flour of pumice. A "window" is then formed on the labial surface by clamping a 1.0 cm diameter inert silicon rubber circle to the surface and covering the remaining exposed enamel with self-curing acrylic. When the acrylic has hardened, the silicon rubber circle is removed, thus exposing a 1.0 cm round area of enamel of reproducible size.

The candy to be evaluated is initially dissolved at a level of 1 part by weight with 3 parts of redistilled water to simulate dilution in the mouth. The windowed teeth are then placed into 25.0 mls of the candy solution for a specific period of time (5.0 minutes approximating the oral clearance time of the tableted candy of this invention) at a constant stirring rate of 60 rpm. When the treatment is completed, the amount of demineralized calcium present in the candy solution is determined by means of standard atomic absorption spectrophotometry. An appropriate blank of the candy solution is also analyzed to determine the amount of calcium, if any, that is inherently present. This inherent calcium is then subtracted to give the correct value for the amount of calcium decalcified from the tooth enamel.

Oral clearance of candy products is determined as follows. Each candy product is incorporated with a low level of non-toxic water insoluble blue dye, such as purified phthalocyanine. After the subject has eaten the candy containing the dye, a visual inspection using a pen flashlight and mouth mirror is made periodically until all traces of blue dye have dissipated. The time required for the dyed candy to be no longer visible on any tooth surface is taken as the oral clearance time. The foregoing method for determining oral clearance is preferred to the alternative of determining the presence of carbohydrates in the saliva because the latter methodology is not sensitive to the presence of candy fragments in interproximal areas or below the gingival margin, which fragments may significantly contribute to dental caries formation.

Plaque pH drop, enamel decalcification, and oral clearance data have been obtained for several candy products produced in accordance with this invention (e.g., the candies of Examples XI, XII, XIII and XIV. For comparative purposes, similar data have been obtained for a series of conventional candy products of the same type and differing from the candies of this invention only in that conventional nutritive sweeteners were employed. These data, which are given in Table I, dramatically demonstrate the difference in terms of pH effects and enamel decalcification encountered with the candy products of this invention as compared with the prior art sucrose containing candies, and they further show that rapid oral clearance is not sacrificed in achieving these objectives. In the case of "sticky" candies (e.g., peanut brittle, taffy, and chocolate candy coatings), the slow oral clearance rates of conventional sucrose containing products are greatly improved by using the sweetening system of this invention.

TABLE I

| Production Description | % Change in Plaque pH | Oral Clearance (min.) | Enamel Dissolved (mg $Ca^{+2}$) |
|---|---|---|---|
| Example I-Tableted Candy | 18.8 | 3.6 | 0.21 |
| Corresponding dextrose candy | 105.6 | 3.6 | 5.16 |
| Example XII-Taffy | 33.3 | 4.2 | — |
| Corresponding sucrose candy | 82.4 | 9.0 | — |
| Example XIII-Chocolate Candy coating | 8.4 | 8.0 | — |
| Corresponding sucrose candy | 139.0 | 14.0 | — |
| Example XIV-Peanut brittle | +9.3 | 5.5 | — |
| Corresponding sucrose candy | 92.5 | 10.8 | — |
| Example X-cooked hard candy | +7.6 | 4.4 | — |
| Corresponding sucrose candy | 132.1 | 4.6 | — |

The maximum levels of about 25% dextrose and 40% fructose in the mixtures of this invention have been determined on the basis of plaque pH data determined in the foregoing manner. In particular, the critical maximum second agent levels are those at which it can be assured that the plaque pH in all events will not drop below the minimum safe pH level of 6.0.

Applicants believe that 6.0 is the minimum plaque pH that can be tolerated without adverse oral health effects. This requirement is generally in line with the approach taken by others. By way of example, according to Dr. H. R. Muhlemann of the Department of Cariology and Periodontology of the Dental Institute of the University of Zurich, the Swiss Office of Health has prohibited manufacturers from claiming sugarless candies are "tooth protective" where the plaque pH drops below 5.7. The Swiss pH measurement method differs somewhat from the Kleinberg technique employed by applicants, and the Swiss work thus generally confirms the validity of using plaque pH criteria.

Further support for applicants' selection of pH 6.0 as a safe minimum is found in Bowen, "Dental Caries" Contemporary Nutrition, Vol. 2, No. 3 (August, 1977) which notes that a tooth will begin to dissolve rapidly when the pH drops as low as 5.5.

Table II gives the composition of the various sweetening systems tested and the minimum plaque pH values measured by the previously described method. In addition, Table II sets forth the data plotted in FIGS. 1-4.

TABLE II

| Weight % | | | | Minimum Plaque pH Level After Challenge | | | | | | | |
|---|---|---|---|---|---|---|---|---|---|---|---|
| First Agent | | Second Agent | | | | | | | | | |
| Sorbitol | Xylitol | Dextrose | Fructose | Trial 1 | Trial 2 | Trial 3 | Trial 4 | Trial 5 | Trial 6 | Trial 7 | Mean |
| 100 | 0 | 0 | 0 | 7.5 | 7.1 | 7.7 | 6.5 | 7.0 | — | — | 7.16 |
| 75 | 0 | 25 | 0 | 6.7 | 6.2 | 6.0 | 6.5 | 6.7 | 6.4 | — | 6.42 |
| 50 | 0 | 50 | 0 | 6.6 | 5.9 | 6.1 | 6.0 | 5.3 | 5.3 | 5.0 | 5.74 |
| 25 | 0 | 75 | 0 | 5.7 | 6.6 | 6.2 | 6.1 | 5.3 | 5.6 | 5.4 | 5.84 |
| 0 | 0 | 100 | 0 | 6.3 | 6.0 | 5.6 | 5.9 | 5.7 | 5.4 | — | 5.82 |
| 100 | 0 | 0 | 0 | 7.1 | 6.6 | 6.5 | 6.9 | 7.2 | 7.0 | — | 6.88 |
| 87.5 | 0 | 0 | 12.5 | 6.4 | 6.7 | 6.6 | 6.8 | 6.9 | 7.0 | — | 6.73 |
| 75 | 0 | 0 | 25 | 6.7 | 6.9 | 7.3 | 6.9 | 7.4 | 6.4 | — | 6.93 |
| 50 | 0 | 0 | 50 | 6.0 | 5.4 | 6.2 | 6.0 | 5.4 | 6.2 | — | 5.87 |
| 25 | 0 | 0 | 75 | 6.1 | 6.1 | 6.5 | 6.0 | 5.6 | 6.4 | — | 6.12 |
| 0 | 0 | 0 | 100 | 6.4 | 5.8 | 6.2 | 6.0 | 5.2 | 5.6 | — | 5.87 |
| 0 | 100 | 0 | 0 | 7.4 | 6.7 | 7.1 | 7.0 | 6.7 | 7.3 | — | 7.03 |
| 0 | 87.5 | 12.5 | 0 | 6.9 | 6.7 | 6.6 | 7.0 | 6.7 | 6.8 | — | 6.78 |
| 0 | 75 | 25 | 0 | 7.2 | 6.6 | 6.9 | 6.9 | 7.1 | 6.4 | — | 6.82 |
| 0 | 50 | 50 | 0 | 5.8 | 6.5 | 5.8 | 5.2 | 5.8 | 6.1 | — | 5.87 |
| 0 | 25 | 75 | 0 | 6.4 | 6.0 | 6.2 | 5.9 | 6.3 | 5.6 | — | 6.07 |
| 0 | 87.5 | 0 | 12.5 | 6.7 | 6.3 | 6.9 | 6.9 | 6.7 | 6.3 | — | 6.63 |
| 0 | 75 | 0 | 25 | 6.4 | 6.7 | 6.0 | 7.0 | 7.0 | 6.4 | — | 6.73 |
| 0 | 50 | 0 | 50 | 6.0 | 6.3 | 5.8 | 6.3 | 5.2 | 6.0 | — | 6.10 |
| 0 | 25 | 0 | 75 | 6.0 | 6.3 | 5.8 | | 6.3 | 6.2 | — | 6.17 |

FIGS. 1–4 are curves plotting minimum plaque pH values versus composition derived from the foregoing tests. In the case of each composition, lower and upper limit curves have been plotted along with the mean value. The critical composition parameters in accordance with this invention are determined by the minimum amount of first agent (and maximum amount of second agent) at which the desired pH 6.0 minimum level can be maintained. Since the objective is that substantially all members of the population be afforded protection, the precise compositions are determined by the lower limit plots from FIGS. 1–4, specifically the composition corresponding to the approximate point at which the lower limit plot intersects the pH 6.0 horizontal line. Thus, as shown by FIGS. 1–4, where dextrose is the second agent up to about 25% dextrose may be employed with about 75% or more sorbitol and/or xylitol, and where fructose is the second agent, up to about 40% fructose may be employed with about 60% or more sorbitol and/or xylitol.

Using the foregoing criteria, applicants have in a similar manner experimentally determined that a mixture of about 95% sorbitol and 5% sucrose also meets the desired pH 6.0 minimum level. However, replacement of such a minor amount of sorbitol with sucrose does not offer the taste advantages of the other mixtures disclosed herein and therefore is not practical.

The safety of adipic and ascorbic acids is demonstrated by the data given in TABLE III which reports the enamel decalcification levels caused by a variety of carboxylic acids. The candy base used in this study consisted of a tableted candy containing on a part by weight basis, 72.4 parts sorbitol, 24.1 parts dextrose, and 0.5 parts flavorings, colorings, etc.

TABLE III

| Constituents | Enamel Decalcified (ug $Ca^{+2}$) | Statistical Difference |
|---|---|---|
| Candy Base | 0.13 ± 0.21 | — |
| Candy base plus 3% adipic acid | 0.21 ± 0.26 | none |
| Candy base plus 3% ascorbic acid | 0.12 ± 0.30 | none |
| Candy base plus 3% citric acid | 5.16 ± 1.96 | $p < .005$ |
| Candy base plus 3% fumaric acid | 2.25 ± 1.56 | $p < .025$ |
| Candy base plus 3% glutaric acid | 0.79 ± 0.24 | $p < .025$ |
| Candy base plus 3% malic acid | 2.66 ± 0.30 | $p < .025$ |
| Candy base plus 3% succinic acid | 0.62 ± 0.30 | $p < .05$ |
| Candy base plus 3% tartaric acid | 4.16 ± 0.37 | $p < .005$ |

While the foregoing invention has been described with respect to candy products in particular, these techniques are intended to and have utility in relation to other food products containing nutritive sweeteners in which the invention mixture may be employed.

We claim:

1. A sweetened comestible comprising as a noncariogenic nutritive sweetener a homogeneous mixture of at least one first sweetening agent selected from the group consisting of sorbitol, xylitol, and mixtures thereof and at least one second sweetening agent selected from the group consisting of dextrose, fructose, and mixtures thereof, with the mixture containing at least about 75% of the first agent by weight of the mixture where dextrose is the second agent and at least about 60% of the first agent by weight where fructose is the second agent, the mixture being present in an amount effective to sweeten the comestible.

2. A comestible, as claimed in claim 1, wherein the mixture is present at a level of about 40–100% by weight of the comestible.

3. A comestible, as claimed in claim 1, and further comprising a member selected from the group consisting of adipic acid, ascorbic acid, and mixtures thereof.

4. A comestible, as claimed in claim 3, wherein the member is present at a level of up to about 6% by weight.

5. A comestible, as claimed in claim 1, wherein the first agent is sorbitol and the second agent is dextrose.

6. A comestible, as claimed in claim 1, wherein the first agent is sorbitol and the second agent is fructose.

7. A comestible, as claimed in claim 1, wherein the first agent is xylitol and the second agent is dextrose.

8. A comestible, as claimed in claim 1, wherein the first agent is xylitol and the second agent is fructose.

9. A noncariogenic candy comprising as a nutritive sweetener a homogeneous mixture of a first sweetening agent selected from the group consisting of sorbitol, xylitol and mixtures thereof and at least one second sweetening agent selected from the group consisting of dextrose, fructose, and mixtures thereof, with the mixture containing at least about 75% of the first agent by weight of the mixture where dextrose is the second agent and at least about 60% of the first agent by weight of the mixture where the second agent is fructose, the mixture being present in an amount effective to sweeten the candy.

10. A noncariogenic candy, as claimed in claim 9, wherein the sweetener is a mixture of sorbitol and dextrose containing about 25% dextrose by weight of the mixture.

11. A noncariogenic candy, as claimed in claim 9, and further comprising a member selected from the group consisting of adipic acid, ascorbic acid, and mixtures thereof.

12. A noncariogenic candy, as claimed in claim 11, wherein the sweetener is a mixture of sorbitol and dextrose containing about 25% dextrose by weight of the mixture and wherein the member is adipic acid.

13. A noncariogenic candy, as claimed in claim 11, wherein the nutritive sweetener is present at a level of about 40–100% by weight and the member is present at a level of up to about 6% by weight.

14. A process for rendering a nutritive sweetening agent-containing candy noncariogenic comprising the step of incorporating therein as a nutritive sweetener a homogeneous mixture of at least one first sweetening agent selected from the group consisting of sorbitol, xylitol and mixtures thereof and at least one second sweetening agent selected from the group consisting of dextrose, fructose, and mixtures thereof, with the mixture containing at least about 75% of the first agent by weight of the mixture where dextrose is the second agent and at least about 60% of the first agent by weight of the mixture where fructose is the second agent, the mixture being incorporated in an amount effective to sweeten the candy.

15. A process, as claimed in claim 14, wherein the nutritive sweetener is present at a level of about 40–100% by weight.

16. A process, as claimed in claim 14, and further comprising the step of incorporating in the candy a member selected from the group consisting of adipic acid, ascorbic acid, and mixtures thereof as a flavoring agent.

17. A process, as claimed in claim 14, wherein the member is incorporated at a level of up to about 6% by weight.

18. A process, as claimed in claim 14, wherein the first agent is sorbitol and the second agent is dextrose.

* * * * *